(12) United States Patent
Huang et al.

(10) Patent No.: US 8,279,270 B2
(45) Date of Patent: Oct. 2, 2012

(54) THREE DIMENSIONAL DISPLAY (75) Inventors: Yi-Pai Huang, Chiayi (TW); Chih-Wei Chen, Taoyuan County (TW); To-Chiang Shen, Taipei (TW)

(73) Assignee: National Chiao Tung University, Hsinchu (TW)

( * ) Notice: Subject to any disclaimer, the term of this patent is extended or adjusted under 35 U.S.C. 154(b) by 542 days.

(21) Appl. No.: 12/539,623

(22) Filed: Aug. 12, 2009

(65) Prior Publication Data
US 2010/0302349 A1 Dec. 2, 2010

(30) Foreign Application Priority Data

Jun. 1, 2009 (TW) .............................. 98118040 A (51) Int. Cl.
H04N 13/04 (2006.01)
(52) U.S. Cl. ......................................................... 348/51
(58) Field of Classification Search .............. 348/42–60, 348/E13.054
See application file for complete search history.

(56) References Cited

U.S. PATENT DOCUMENTS

| 6,064,424 | A | 5/2000 | van Berkel et al. | |
|---|---|---|---|---|
| 7,154,653 | B2 | 12/2006 | Kean et al. | |
| 2007/0285411 | A1* | 12/2007 | Yang et al. | 345/207 |
| 2010/0079584 | A1* | 4/2010 | Sung et al. | 348/52 |

FOREIGN PATENT DOCUMENTS

| JP | 07-072445 | 3/1995 |
|---|---|---|
| JP | 2002-328333 | 11/2002 |
| JP | 2003-202519 | 7/2003 |
| JP | 2004-226856 | 8/2004 |
| JP | 2004-325494 | 11/2004 |
| JP | 2007-025601 | 2/2007 |
| JP | 2007-234591 | 9/2007 |
| JP | 2009-058767 | 3/2009 |
| KR | 2003-0022583 | 3/2003 |

OTHER PUBLICATIONS

"Office Action of Korean Counterpart Application", issued on Feb. 21, 2011, with English translation thereof, p. 1-p. 7, in which the listed reference was cited.
Authored by Berkel, et al., article titled "Characterisation and Optimisation of 3D-LCD Module Design," adopted from Published Proc SPIE vol. 3012 pp. 179-187 (1997).
Authored by Yoshigi, et al., "Full Screen High Resolution Stereoscopic 3D Display Using LCD and EL panels," adopted from Proc. of SPIE vol. 6399 (2006).
"Office Action of Japan Counterpart Application", issued on Nov. 14, 2011, p. 1-p. 2, in which the listed references were cited.
"Office Action of Japan counterpart application" issued on Mar. 2, 2012, p. 1-p. 2, in which the listed references were cited.

* cited by examiner

Primary Examiner — Chirag R Patel
(74) Attorney, Agent, or Firm — Jianq Chyun IP Office (57) ABSTRACT

A three dimensional display includes a display panel and a view-scanning layer. The display panel is used to display many display images quickly. The view-scanning layer is disposed on the display panel and receives the display images. The view-scanning layer has many light refracting modulation regions. Each of the light refracting modulation regions includes a view-scanning unit. The view-scanning unit changes an ongoing direction of a light according to an applied electric field so as to project a part of each of the display images at different view directions. Here, each of the view directions corresponds to the ongoing direction of the light.

11 Claims, 5 Drawing Sheets

THREE DIMENSIONAL DISPLAY

CROSS-REFERENCE TO RELATED APPLICATION

This application claims the priority benefit of Taiwan application serial no. 98118040, filed on Jun. 1, 2009. The entirety of the above-mentioned patent application is hereby incorporated by reference herein and made a part of specification.

BACKGROUND OF THE INVENTION

1. Field of the Invention

The present invention relates to a display, and more particularly, to a three-dimensional display (3D-display).

2. Description of Related Art

Current three-dimensional (3D) display techniques are mainly classified into a stereoscopic type and an auto-stereoscopic type. The auto-stereoscopic type technique can be achieved by applying a holography method, a volumetric method, a multi-plane method, and a spatial-multiplexed method, etc. However, all the above methods have disadvantages. For example, a massive amount of data must be processed when the holography method is conducted, and the volumetric method or the multi-plane method is constrained by machine size and the space.

In a conventional spatial-multiplexed 3D display technique, barriers or lenses are disposed in front of a display panel to project images to different positions, such that a left eye and a right eye of a viewer is able to receive images at different angles, respectively. Further, the images received by the left-eye and the right-eye of the viewer are merged in the brain of the viewer, such that a 3D image is perceived.

Figure 1:
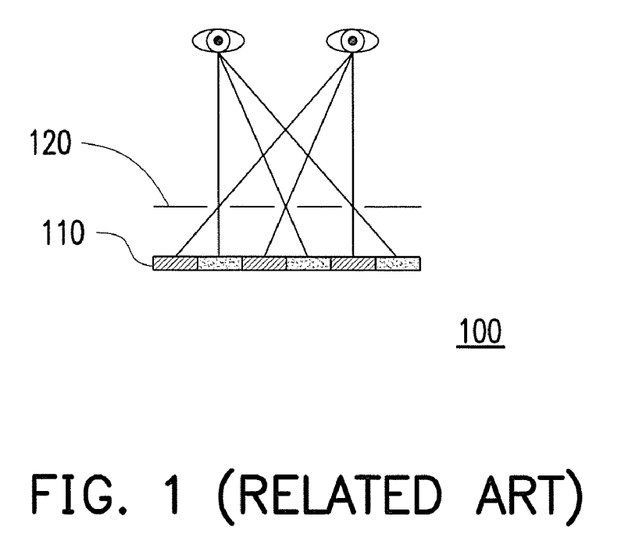
FIG. 1 is a schematic diagram of a conventional 3D-LCD.

FIG. 1 is a schematic diagram of a conventional 3D-liquid crystal display (3D-LCD). Referring to FIG. 1, the LCD 100 includes a plurality of parallax barriers 120 disposed in front of pixel units 110 for blocking light emitted from certain angles. Thus, the left and right eyes of the viewer respectively observe different pixel units 110, and accordingly the 3D image is perceived.

However, since the parallax barriers 120 of the LCD 100 block most of the light, the brightness of the 3D image is decreased.

Besides, the parallax barriers 120 separate the 3D image into the images respectively received by the left and right eyes. Thus, even though the LCD 100 is able to display the 3D image, resolution of the image displayed on the LCD 100 is reduced.

More particularly, the image resolution is reduced by half when the viewer closes his or her left or right eye.

Furthermore, since only two images are respectively provided for the left eye and the right eye, the viewer needs to be at a proper distance and position so as to perceive the corresponding 3D image, such that the choices of the viewing position are limited.

Figure 2:
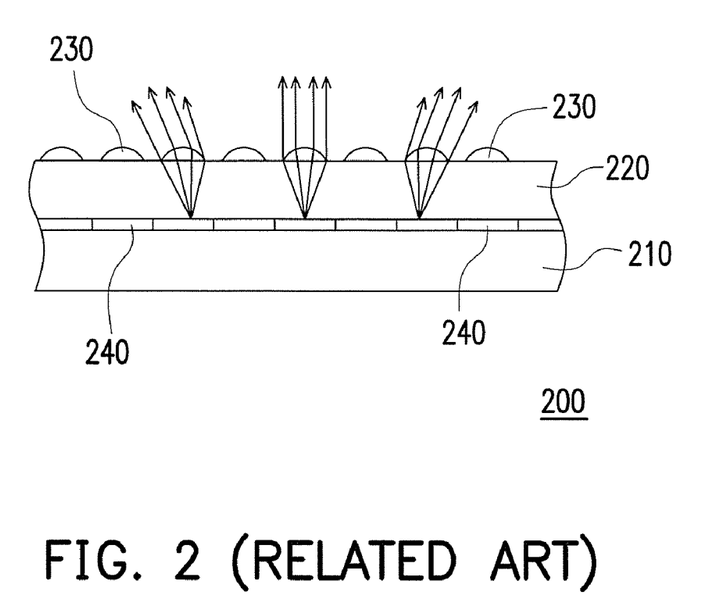
FIG. 2 is a schematic diagram of another conventional 3D-LCD.

FIG. 2 is a schematic diagram of another conventional 3D-LCD. Referring to FIG. 2, the LCD 200 includes a first substrate 210 and a second substrate 220.

Curved lenses 230 of the 3D-LCD 200 are fabricated on the second substrate 220, and each of the curved lenses 230 is disposed corresponding to one pixel unit 240, such that the curved lenses 230 are able to control a refraction angle of light which passes through the corresponding pixel unit 240.

Thus, both eyes of the viewer receive different images generated by different pixel units 240, and accordingly the 3D image is perceived.

In addition, since the curved lenses 230 refract the images generated by the pixel units 240 to be at different angles, as long as the left eye and the right eye of the viewer respectively receive two of the images projected at different angles, the 3D image is perceived. Thus, in comparison with the LCD 100 as shown in FIG. 1, the LCD 200 allows the viewer to receive the 3D image at more view angles.

That is to say, the viewer is able to view different 3D images from different directions.

It should be noted that, if the LCD 200 displays a single 3D image with different view angles under a fixed resolution, the resolution of the 3D image provided by the LCD 200 is significantly decreased compared with the LCD 100 which provides a single view angle.

In addition, the curved lenses 230 are fabricated on the second substrate 220, and each of the curved lenses 230 must be disposed corresponding to one of the pixel units 240. Therefore, high alignment accuracy is required during fabrication, such that each of the curved lenses 230 disposed on a proper location for controlling the light emitting angle can be guaranteed. Furthermore, since fabrication of the curved lenses 230 is rather difficult, and each of the curved lenses 230 can be barely aligned to one of the pixel units 240 accurately, fabrication costs of the 3D-LCD 200 are hardly reduced.

U.S. Pat. No. 6,064,424 provides a 3D-LCD similar to the LCD 200 depicted in FIG. 2, in which a slanted lenticular element (equivalent to the curved lenses 230 as shown in FIG. 2) is used to project light of each of pixel units (equivalent to the pixel units 240 in FIG. 2) at different directions, such that the left and the right eyes of the viewer are able to receive different images, and then the 3D image can be perceived.

Hence, the 3D-display disclosed in said US patent has unfavorable resolution as that of the LCD 200.

In the light of the above, the conventional spatial-multiplexed 3D display still has disadvantages, such as low resolution, insufficient brightness, small view angles, image crosstalk, and so on.

SUMMARY OF THE INVENTION

The present invention provides a 3D-display having a view-scanning layer. The view-scanning layer changes an ongoing direction of light according to an applied electric field, so as to project a part of each display image at different view directions.

The present invention provides a 3D-display which includes a display panel and a view-scanning layer. The display panel is used to rapidly display a plurality of display images. The view-scanning layer is disposed on the display panel and receives the display images. The view-scanning layer has a plurality of light refracting modulation regions. Each of the light refracting modulation regions includes a view-scanning unit. The view-scanning unit changes an ongoing direction of light according to an applied electric field, so as to project a part of each of the display images at different view directions, wherein each of the view directions corresponds to the ongoing direction of the light.

In an embodiment of the present invention, the view-scanning layer further includes a first substrate and a second substrate. The first substrate includes a first base and a common electrode. The common electrode is disposed on the first base, and the view-scanning unit is disposed on the common electrode. The second substrate includes a second base and a plurality of control electrodes. The control electrodes are disposed on the second base, and the second base is disposed on the view-scanning unit.

In an embodiment of the present invention, the view-scanning layer further includes a first substrate and a second substrate. The first substrate includes a first base and a common electrode. The common electrode is disposed on the first base, and the view-scanning unit is disposed on the common electrode. The second substrate includes a second base and a plurality of control electrodes. The control electrodes are disposed on the second base and located near the view-scanning unit.

In an embodiment of the present invention, the display panel has a plurality of sub-pixel regions, and each of the view-scanning units respectively corresponds to parts of the sub-pixel regions.

In an embodiment of the present invention, the display panel further includes a first light emitting layer. The first light emitting layer includes a plurality of first light emitting devices which are respectively located in one of the sub-pixel regions.

In an embodiment of the present invention, the display panel further includes a second light emitting layer. The second light emitting layer is disposed on the first light emitting layer and includes a plurality of second light emitting devices which are respectively located in one of the sub-pixel regions.

In an embodiment of the present invention, the first light emitting devices include organic light emitting diodes.

In an embodiment of the present invention, the second light emitting devices include organic light emitting diodes.

In an embodiment of the present invention, a material of the view-scanning unit includes liquid crystal molecules or electro-wetting fluid.

In an embodiment of the present invention, a material of the common electrode and the control electrodes includes a transparent conductive material.

In an embodiment of the present invention, the material of the common electrode and the control electrodes includes indium tin oxide (ITO) or indium zinc oxide (IZO).

Based on the above, the present invention utilizes the characteristics of the view-scanning units, i.e., changing the ongoing direction of the light according to the applied electric field, such that different parts of each of the display images are projected in several view directions at different time. Thus, the left eye and the right eye of the viewer are able to receive the display images from different directions, and the 3D image is then perceived.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

First Embodiment

Figure 3A:
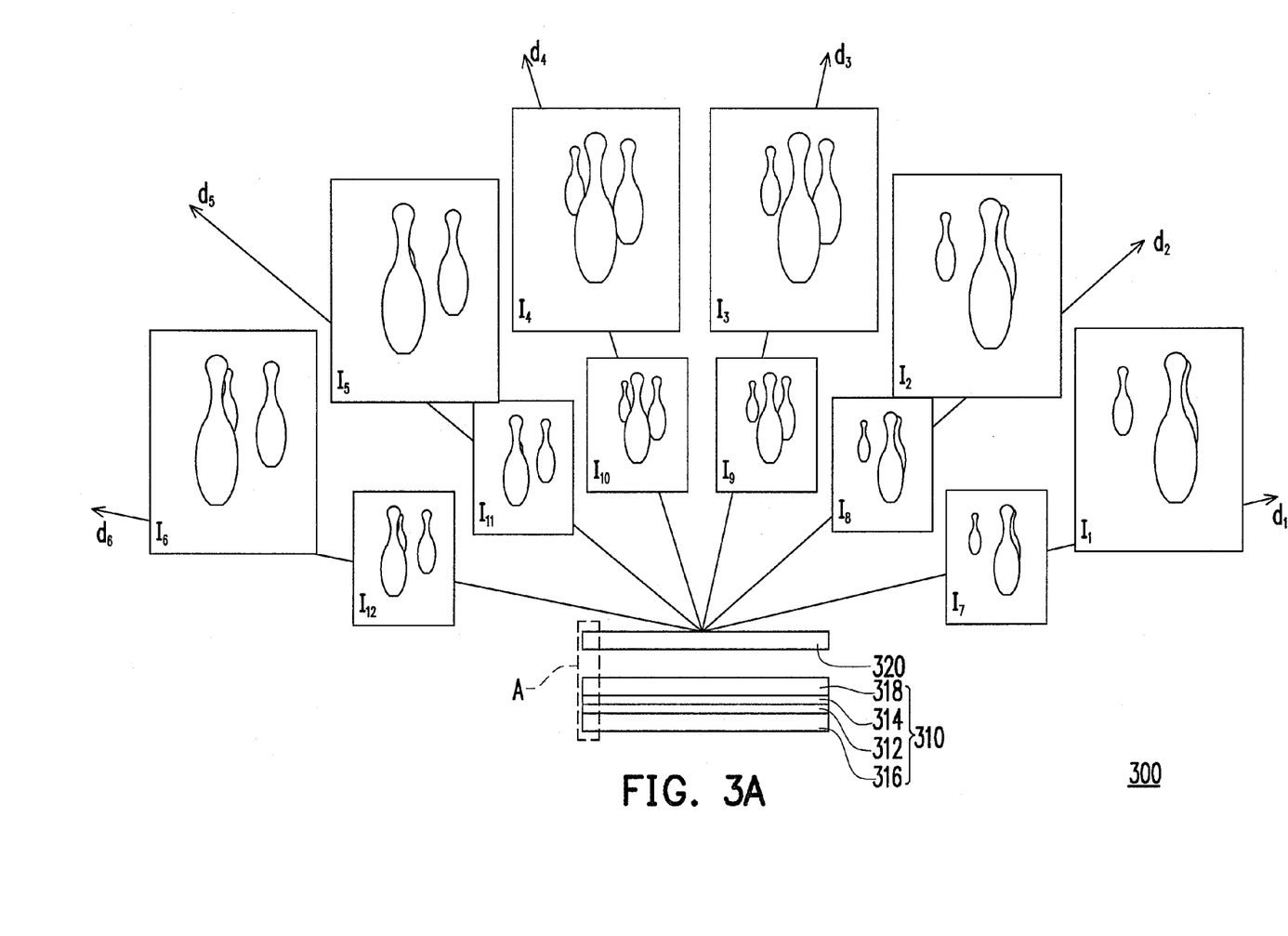
FIG. 3A is a schematic cross-sectional view of a 3D-display according to a first embodiment of the present invention.
Figure 3B:
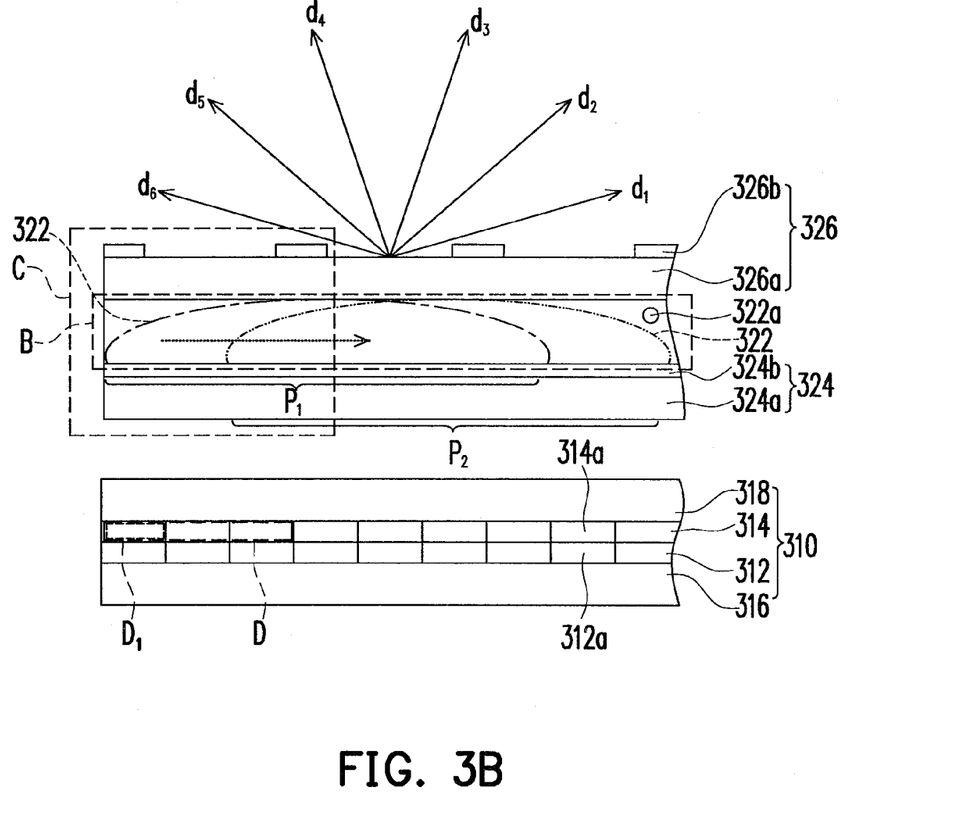
FIG. 3B is a partially enlarged view of an area A of the 3D display depicted in FIG. 3A.

FIG. 3A is a schematic cross-sectional view of a 3D-display 300 according to a first embodiment of the present invention. Referring to FIG. 3A, a 3D-display 300 of the present embodiment includes a display panel 310 and a view-scanning layer 320. The display panel 310 is used to rapidly display the display images $I_1 \sim I_{12}$ in sequence (only 12 display images are schematically shown in FIG. 3A). The view-scanning layer 320 is disposed on the display panel 310 and receives the display images $I_1 \sim I_{12}$. FIG. 3B is a partially enlarged view of an area A of the 3D display 300 in FIG. 3A. Referring to both FIG. 3A and FIG. 3B, the view-scanning layer 320 has a plurality of light refracting modulation regions B, and each of the light refracting modulation regions B includes a view-scanning unit 322.

Besides, as shown in FIG. 3B, the view-scanning layer 320 further includes a first substrate 324 and a second substrate 326. The first substrate 324 includes a first base 324a and a common electrode 324b. The common electrode 324b is disposed on the first base 324a, and the view-scanning unit 322 is disposed on the common electrode 324b. The second substrate 326 includes a second base 326a and a plurality of control electrodes 326b. The control electrodes 326b are disposed on the second base 326a, and the second base 326a is disposed on the view-scanning unit 322. In the embodiment, the common electrode 324b and the control electrode 326b are transparent conductive materials, for example, indium tin oxide (ITO) or indium zinc oxide (IZO).

It should be noted that the view-scanning unit 322 of the present embodiment changes an ongoing direction of light according to an applied electric field. Thus, the view-scanning unit 322 projects a part of each of the display images at different view directions $d_1 \sim d_6$ (only 6 directions are schematically shown in both FIGS. 3A and 3B), wherein each of the view directions corresponds to the ongoing direction of the light. Furthermore, the view-scanning layer 320 is composed of LC molecules 322a, for example, and each of the light refracting modulation regions B includes a plurality of LC molecules (only one LC molecule is schematically shown in FIG. 3B) in the embodiment.

Figure 3C:
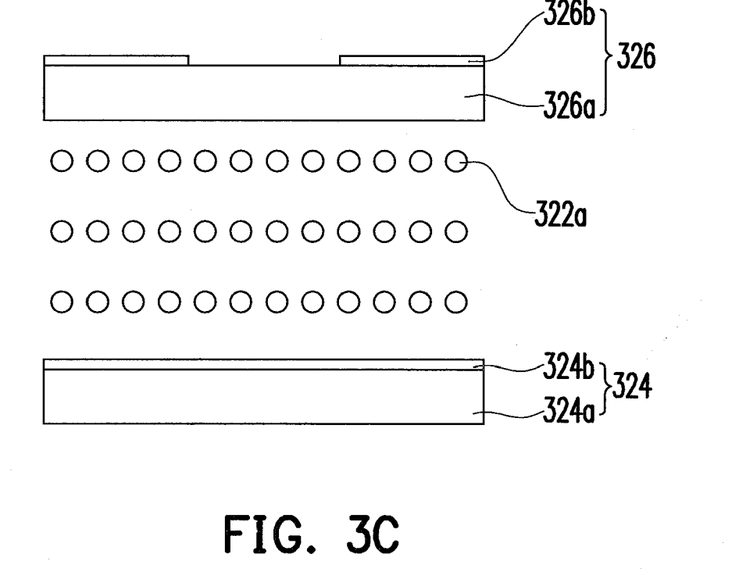
FIG. 3C shows an arrangement of liquid crystal (LC) molecules in an area C depicted in FIG. 3B without applying an electric field.

FIG. 3C shows an arrangement of the LC molecules 322a in an area C depicted in FIG. 3B without applying an electric field. FIG. 3D shows an arrangement of the LC molecules 322a in the area C depicted in FIG. 3B with an applied electric field. Referring to both FIG. 3B and FIG. 3C, before supplying an applied voltage to the common electrode 324b and the control electrodes 326b, all LC molecules are arranged along the same direction (i.e. the direction vertical to the paper) because the LC molecules are not affected by an applied electric field. Besides, the LC molecules are characterized by birefringence, and an effective refractive index thereof is represented as $n_{eff}(\theta) = \sqrt{n_o(\theta)^2 + n_e(\theta)^2}$, where $n_o$ and $n_e$ are respectively the ordinary refractive index and the extraordinary refractive index of the LC molecules. Hence, for the light incident to the LC molecules 322a in the same direction, the effective refractive indexes of the LC molecules 322a are all the same. Thus, the incident light at the same direction has the same refraction direction after passing through the LC molecules 322a at different position.

Figure 3D:
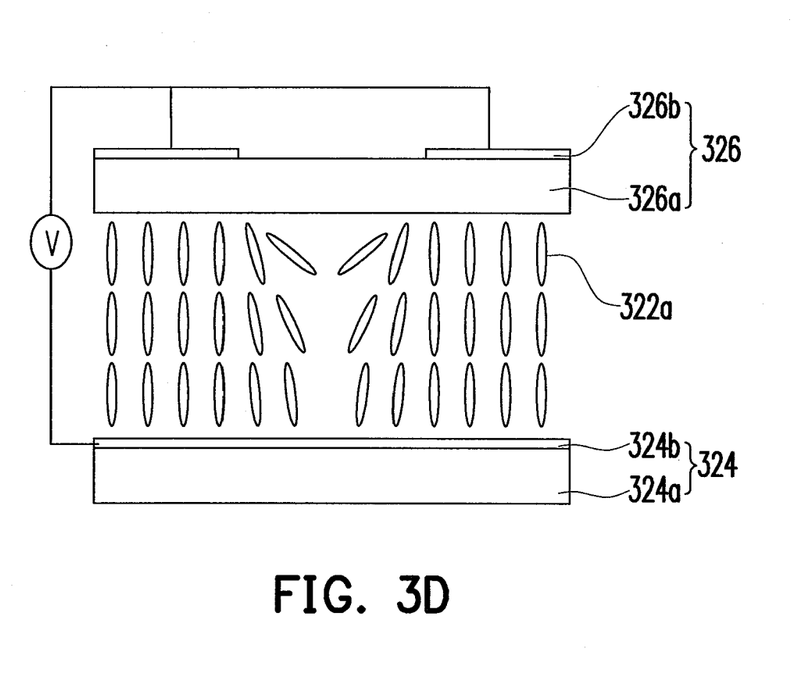
FIG. 3D shows an arrangement of the LC molecules in the area C depicted in FIG. 3B with an applied electric field.

In addition, as shown in FIG. 3D, when applying a voltage V to the common electrode 324b and the control electrodes 326b, the LC molecules 322a at different positions are tilted toward different directions according to the electric field at the corresponding position. Hence, for the light incident to the LC molecules 322a in the same direction, the effective refractive indexes of the LC molecules 322a are different. Thus, the incident light at same directions has different refraction directions after passing through the LC molecules 322a at different position.

Based on the above, for the light incident to the LC molecules 322a in the same direction, when the effective refractive index of the LC molecules 322a continuously varies with the applied electric field, different parts of each of the display images $I_1$~$I_{12}$ displayed on the display panel 310 are respectively projected in different view directions $d_1$~$d_6$ by the LC molecules 322a at different time, which is the so-called time-multiplexed concept. It should be noted continuous variations in the effective refractive index of the LC molecules 322a is deemed equivalent to the continuous movement of the view-scanning unit 322 as shown in FIG. 3B, and the function of the view-scanning unit 322 is similar to that of a gradient-index lens (GRIN lens).

More particularly, referring to both FIG. 3A and FIG. 3B, given that the display panel 310 respectively displays the display images $I_1$~$I_{12}$ at image-displaying time $t_1$~$t_{12}$, the view-scanning unit 322 is regarded as being at the position $P_1$ from the image-displaying time $t_1$ to the image-displaying time $t_6$, and the view-scanning unit 322 respectively refracts a part of each of the display images $I_1$~$I_6$ at the view directions $d_1$~$d_6$ at the image-displaying time $t_1$~$t_6$. From the image-displaying time $t_7$ to the image-displaying time $t_{12}$, the view-scanning unit 322 is regarded as being at the position $P_2$, and the view-scanning unit 322 respectively refracts a part of each of the display images $I_7$~$I_2$ at view directions $d_1$~$d_6$ at the image-displaying time $t_7$~$t_{12}$. That is to say, the view-scanning unit 322 composed of the LC molecules 322a is equivalent to a moveable switching LC lens which continuously moves back and forth in the light refracting modulation region B.

In addition, the display images $I_1$ and $I_7$ are substantially the same display images in the present embodiment, whereas the view-scanning unit 322 projects different parts of the display image $I_1$ (display image $I_7$) at different positions. Thus, the movement of the view-scanning unit 322 from the position $P_1$ to the position $P_2$ should be completed within a frame period, such that the viewer is able to perceive the complete 3D display image.

Specifically, in the present embodiment, the view-scanning unit 322 at the position $P_1$ and the position $P_2$ respectively contributes half of each of the display images $I_1$~$I_6$ (or display images $I_7$~$I_{12}$).

Thus, the 3D-display 300 employs a time multiplexed method to display the entire 3D image, which is different from the conventional 3D display (e.g. the LCD 100 in FIG. 1) displaying the 3D image by spatially partitioning the display image into an image received by the left eye and an image received by the right eye.

On the other hand, the 3D-display 300 does not have image flickers occurring in the conventional time-multiplexed display.

It should be note that, even though only two positions $P_1$ and $P_2$ are schematically shown in FIG. 3B, other positions, e.g. positions $P_3$~$P_6$ (not shown), may be included between the positions $P_1$ and $P_2$ in other embodiments.

Hence, the moving route of the view-scanning unit 322 is from the positions $P_1$, $P_3$, $P_4$, $P_5$, and $P_6$ to the position $P_2$ in sequence. In addition, the view-scanning unit 322 at each of the positions $P_1$~$P_6$ projects a part (e.g. 1/6) of each of the display image $I_1$~$I_6$ at the view directions $d_1$~$d_6$.

That is, the view-scanning unit 322 at different positions respectively contributes different parts (e.g. 1/6) of each of the display image $I_1$~$I_6$. Owing to the rapid movement and fast scanning of the view-scanning unit 322, the complete display images $I_1$~$I_6$ can be displayed at each of the view directions $d_1$~$d_6$ by using the view-scanning unit 322 at different positions to project the different parts of each of the display images $I_1$~$I_6$ at the same view direction.

Similarly, the movement of the view-scanning unit 322 from the positions $P_1$, $P_3$, $P_4$, $P_5$, and $P_6$ to the position $P_2$ should be completed within the frame period.

On the other hand, the time interval between the image-displaying time $t_1$ and the time at which the view-scanning unit 322 returns to the position $P_1$ and displays the same part of the display image $I_1$ must be shorter than a range of time of human visual persistence.

Thus, even from different view directions (i.e. $d_1$~$d_6$), the viewer is able to perceive the same image at the image-displaying time $t_1$ and perceive the complete 3D image.

It should be noted that the view-scanning unit 322 of the present embodiment is equivalent to a lens. However, the view-scanning unit 322 may be equivalent to any component which changes the ongoing direction of the light, e.g. a prism or an LC grating that changes the ongoing direction of the light by changing the relative positions of the common electrode 324b and the control electrodes 326b. In addition, even though the view-scanning unit 322 of the embodiment is composed of the LC molecules 322a, the view-scanning unit 322 can also be composed of electro-wetting fluid in other embodiments.

Moreover, even though there are six schematic view directions $d_1$~$d_6$ in the present embodiment, the 3D-display is able to provide more view directions or less view directions in other embodiments, e.g. 32 different view directions. The view-scanning unit 322 repeatedly projects each of the display images at the 32 view directions every 32 image-displaying time points, and the time interval between the $1^{st}$ image-displaying time and the $32^{nd}$ image-displaying time is shorter than a range of time of human visual persistence. Furthermore, since the 3D-display 300 of the present embodiment includes a plurality of control electrodes 326b, a plurality of the view-scanning units 322 functionally equivalent to the lenses or the prisms are formed in the entire view-scanning layer 320 when the applied voltage is supplied to the common electrode 324b and the control electrodes 326b, and each of the view-scanning units 322 respectively located at one of the light refracting modulation regions B. The view-scanning layer 320 of the present embodiment includes a plurality of control electrodes 326b, and therefore each of the light refracting modulation regions B has one of the corresponding view-scanning units 322, and the view-scanning units 322 of the embodiment is able to precisely project different parts of each of the display images $I_1$~$I_{12}$ at the view directions $d_1$~$d_6$ as shown in FIG. 3B. That is, the function of the view-scanning unit 322 is almost identical to the function of a perfect lens or a perfect prism.

Besides, as shown in FIG. 3A and FIG. 3B, the display panel 310 further includes a first light emitting layer 312 and a second light emitting layer 314. The display panel 310 has a plurality of sub-pixel regions $D_1$, and every three sub-pixel regions $D_1$ together form one pixel region D. The first light emitting layer 312 includes a plurality of first light emitting devices 312a which are respectively located in one of the sub-pixel regions $D_1$. The second light emitting layer 314 includes a plurality of second light emitting devices 314a which are respectively located in one of the sub-pixel regions $D_1$. Thus, both the first light emitting layer 312 and the second light emitting layer 314 are able to respectively provide a complete display image. It is noted that each pixel information in the display images $I_1$~$I_{12}$ can be completely received by the left eye and the right eye of the viewer, which is different from the conventional spatial-multiplexed display in which each of the display images is partially separated into a left-eye display region and a right-eye display region. Thus, the viewer is able to observe the complete display image at each of the view directions, so that the resolution of images displayed on the 3D-display of the embodiment is higher than the resolution of images displayed on the conventional 3D-display.

Beside, since the 3D-display 300 of the embodiment has two light emitting layers (i.e. the first light emitting layer 312 and the second light emitting layer 314), the image refreshing rate of the 3D-display 300 doubles that of the display having only a single light emitting layer. More specifically, given that the backlight of the display image $I_1$ is provided by the first light emitting layer 312 at the image-displaying time $t_1$, the backlight of the display image $I_2$ can be provided by the second light emitting layer 314 at the image-displaying time $t_2$. Hence, when the display panel 310 provides the display image 12, the first light emitting layer 312 can prepare for providing the backlight of the display image $I_3$ at the next image-displaying time $t_3$. That is to say, the backlights of the display images $I_1$~$I_{12}$ are alternately provided by the first light emitting layer 312 and the second light emitting layer 314. Thus, the image refreshing rate of the 3D-display 300 doubles the image refreshing rate of the display having only a single light emitting layer. It is noted that the number of the light emitting layer may be modified by designers. In other embodiments, the 3D-display 300 may further include a third light emitting layer (not shown), and then the image refreshing rate of the 3D-display triples that of the display having only a single light emitting layer.

In addition, as shown in FIG. 3B, each of the view-scanning units 322 respectively corresponds to parts of the sub-pixel regions $D_1$ (9 sub-pixel regions $D_1$ are schematically shown in the embodiment). Moreover, the number of the view angles (i.e. the number of the view directions) which the 3D-display 300 is able to provide is related to the number of the sub-pixel regions $D_1$ (or the number of the pixel regions D) corresponding to the view-scanning unit 322. More specifically, the more the sub-pixel regions $D_1$ which correspond to the view-scanning unit 322, the more the view angles that the 3D-display 300 is able to provide. In other words, the 3D-display 300 is able to provide wider view angles. Thus, the number of the view angles can be adjusted as required by adjusting the number of the sub-pixel regions $D_1$ (or the number of the pixel regions D) to which the view-scanning unit 322 corresponds.

Furthermore, the display panel 310 of the present embodiment further includes a third substrate 316 and a fourth substrate 318, wherein the first light emitting layer 312 is disposed on the third substrate 316, and the second light emitting layer 314 is disposed on the fourth substrate 318. The third substrate 316 and the fourth substrate 318 are transparent substrates, for example. The first light emitting devices 312a and the second light emitting devices 314a are organic light emitting diodes (OLEDs), for example. More particularly, the first light emitting devices 312a and the second light emitting devices 314a are red, green, and blue OLEDs, for example, and the red, green, and blue OLEDs are respectively located in different sub-pixel regions $D_1$. It should be mentioned that even though the first light emitting devices 312a and the second light emitting devices 314a are the OLEDs, the first light emitting devices 312a and the second light emitting devices 314a may be other self-luminous devices in the other embodiments. In addition, since the 3D-display 300 uses the OLED as the backlight source according to the present embodiment, the backlight serving as a pixel module is directly used for imaging, such that the 3D-display 300 is able to provide the display image without utilizing color filters (CFs) or other devices. Hence, the brightness of the 3D-display 300 is higher than that of the conventional display.

In the following embodiments and figures, identical or similar reference numbers stand for identical or similar elements for simple illustration.

Second Embodiment

Figure 4:
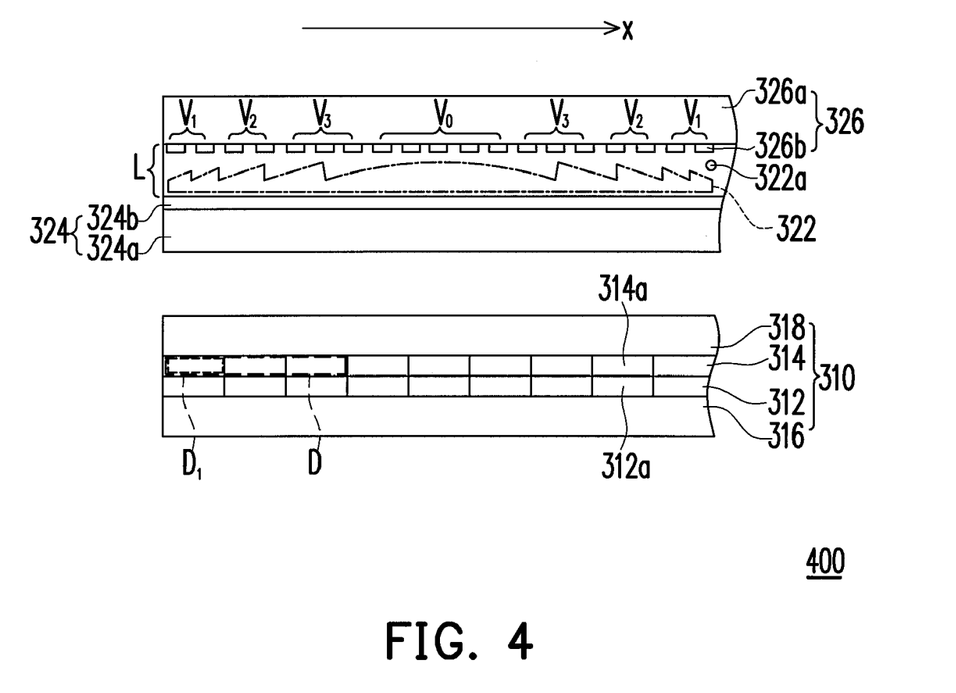
FIG. 4 is a schematic cross-sectional view illustrating parts of a 3D-display according to a second embodiment of the present invention.

FIG. 4 is a schematic cross-sectional view illustrating parts of a 3D-display according to a second embodiment of the present invention. The 3D-display 400 of the present embodiment is similar to the 3D-display 300 in FIG. 3B, while the main difference there between lies in that the control electrodes 326b of the 3D-display 400 are disposed on the second base 326a and located near the view-scanning unit 322. Hence, the view-scanning unit 322 can be regarded as being equivalent to the Fresnel lens by applying different voltages on the control electrodes 326b. Details are described below.

As shown in FIG. 4, the control electrodes 326b are disposed on the second base 326a and located near the view-scanning unit 322, wherein the control electrodes 326b in different numbers are respectively separated into a plurality of equivalent electrodes, and each of the control electrodes 326b has the same width. It should be noted that each of the equivalent electrodes respectively corresponds to equivalent voltages $V_0$~$V_3$, so that the view-scanning unit 322 generates the same effect as that of the Fresnel lens.

Generally speaking, the Fresnel lens has the curved surface and the radian of the traditional convex lens but is thinner than the traditional convex lens. Therefore, the material for producing the Fresnel lens and the volume of the Fresnel lens are reduced. Similarly, based on the above principle, the thickness of the view-scanning layer 320 is reduced, particularly the thickness L as shown in FIG. 4.

On the other hand, the view-scanning unit 322 is regarded as being equivalent to the Fresnel lens continuously moving back and forth when different voltages are applied on each of the control electrodes 326b at different time. Hence, the scanning effect of the view-scanning unit 322 as mentioned above is achieved. Specifically, if the applied voltages $V_0$~$V_3$ corresponding to the control electrodes 326b are shifted along the x direction, the view-scanning unit 322 is equivalently moves along the x direction. Thus, the response time of the LC molecules 322a in the view-scanning layer 320 of the 3D-display 400 is shortened due to reduction in the thickness of the view-scanning layer 320, especially the thickness L, such that the view-scanning layer 320 can rapidly perform scanning operation during a fixed time.

In light of the foregoing, the view-scanning unit of the embodiments of the present invention changes the ongoing direction of the light according to the applied electric field. Hence, by applying the time-multiplexed method, the different images are continuously projected at different view directions at different time, such that the wide view angle is achieved.

In addition, the 3D-display of the embodiments of the present invention employs the double OLED layers as the backlight source, such that the 3D-display has high imaging frame rate and high brightness. Besides, the 3D-display described in the above embodiments provides the viewer with the complete display image at different view directions, which is different from the conventional 3D-display that achieves the multiple view angles by reducing the image resolution, so that the 3D-display described in the above embodiments has higher resolution than that of the conventional 3D-display.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A three dimensional display, comprising:
   a display panel for displaying a plurality of two dimensional display images, wherein the two dimensional display images are different images of a three dimensional object viewed from different view directions; and
   a view-scanning layer disposed on the display panel and receiving the two dimensional display images, the view-scanning layer having a plurality of light refracting modulation regions, wherein each of the light refracting modulation regions comprises a view-scanning unit which changes an ongoing direction of a light according to an applied electric field so as to project a part of each of the two dimensional display images at the different view directions at different times during forming of a three dimensional image, wherein different parts of the same two dimensional display image projected at the same view direction form a complete two dimensional display image, and a plurality of complete two dimensional display images projected at the different view directions forms a three dimensional image of the three dimensional object, and each of the view directions corresponds to the ongoing direction of the light.

2. The three dimensional display of claim 1, wherein the view-scanning layer further comprises:
   a first substrate comprising a first base and a common electrode, wherein the common electrode is disposed on the first base, and the view-scanning unit is disposed on the common electrode; and
   a second substrate comprising a second base and a plurality of control electrodes, wherein the control electrodes are disposed on the second base, and the second base is disposed on the view-scanning unit.

3. The three dimensional display of claim 1, wherein the view-scanning layer further comprises:
   a first substrate comprising a first base and a common electrode, wherein the common electrode is disposed on the first base, and the view-scanning unit is disposed on the common electrode; and
   a second substrate comprising a second base and a plurality of control electrodes, wherein the control electrodes are disposed on the second base and located near the view-scanning unit.

4. The three dimensional display of claim 1, wherein the display panel has a plurality of sub-pixel regions, and each of the view-scanning units respectively corresponds to parts of the sub-pixel regions.

5. The three dimensional display of claim 4, wherein the display panel further comprises a first light emitting layer, and the first light emitting layer comprises a plurality of first light emitting devices which are respectively located in one of the sub-pixel regions.

6. The three dimensional display of claim 5, wherein the display panel further comprises a second light emitting layer, the second light emitting layer is disposed on the first light emitting layer, and the second light emitting layer comprises a plurality of second light emitting devices which are respectively located in one of the sub-pixel regions.

7. The three dimensional display of claim 5, wherein the first light emitting devices comprise organic light emitting diodes.

8. The three dimensional display of claim 6, wherein the second light emitting devices comprise organic light emitting diodes.

9. The three dimensional display of claim 1, wherein a material of the view-scanning unit comprises liquid crystal molecules or electro-wetting fluid.

10. The three dimensional display of claim 2, wherein a material of the common electrode and the control electrodes comprises a transparent conductive material.

11. The three dimensional display of claim 10, wherein the material of the common electrode and the control electrodes comprises indium tin oxide or indium zinc oxide.

* * * * *